United States Patent [19]

Henry

[11] Patent Number: 4,779,913

[45] Date of Patent: Oct. 25, 1988

[54] GARDENING IMPLEMENTS

[76] Inventor: Lloyd Henry, 70 Royal Parade, Pascoe Vale South, 3044, Victoria, Australia

[21] Appl. No.: 27,559

[22] Filed: Mar. 18, 1987

[30] Foreign Application Priority Data

Mar. 18, 1986 [AU] Australia .............................. PH05102

[51] Int. Cl.$^4$ ............................................... A01B 1/16
[52] U.S. Cl. .................................................. 294/50.9
[58] Field of Search ................... 294/50.9, 50.5, 50.6, 294/50.8, 51, 104, 19.1; 56/332, 333, 334, 335, 336; 172/371; 7/114

[56] References Cited

U.S. PATENT DOCUMENTS

| | | | |
|---|---|---|---|
| 777,963 | 12/1904 | Link | 294/50.9 |
| 2,087,128 | 7/1937 | Stalker | 294/50.9 |
| 2,185,552 | 1/1940 | Hecox | 294/50.9 |
| 3,918,757 | 11/1975 | Huber | 294/50.9 |
| 3,990,146 | 11/1976 | Asselta | 294/50.9 |
| 4,400,029 | 8/1983 | Delpidio | 294/50.9 |
| 4,547,010 | 10/1985 | Camp | 294/50.9 |

FOREIGN PATENT DOCUMENTS

| | | |
|---|---|---|
| 385466 | 12/1932 | United Kingdom . |
| 454164 | 9/1936 | United Kingdom . |
| 480484 | 2/1938 | United Kingdom . |
| 753383 | 7/1956 | United Kingdom . |

Primary Examiner—James B. Marbert
Attorney, Agent, or Firm—Majestic, Gallagher, Parsons & Siebert

[57] ABSTRACT

An implement for digging, weeding and the like tasks, especially intended to allow for carrying out of such tasks by invalid and/or incapacitated people, the implement including two relatively movable members for gripping a weed, those two members in turn each being attached to an elongate handle. The handle includes means operably connected to at least one of the relatively movable members whereby to allow for the desired movement. The implement allows for digging, weeding, and the like tasks to be effected with a minimum of bending.

8 Claims, 1 Drawing Sheet

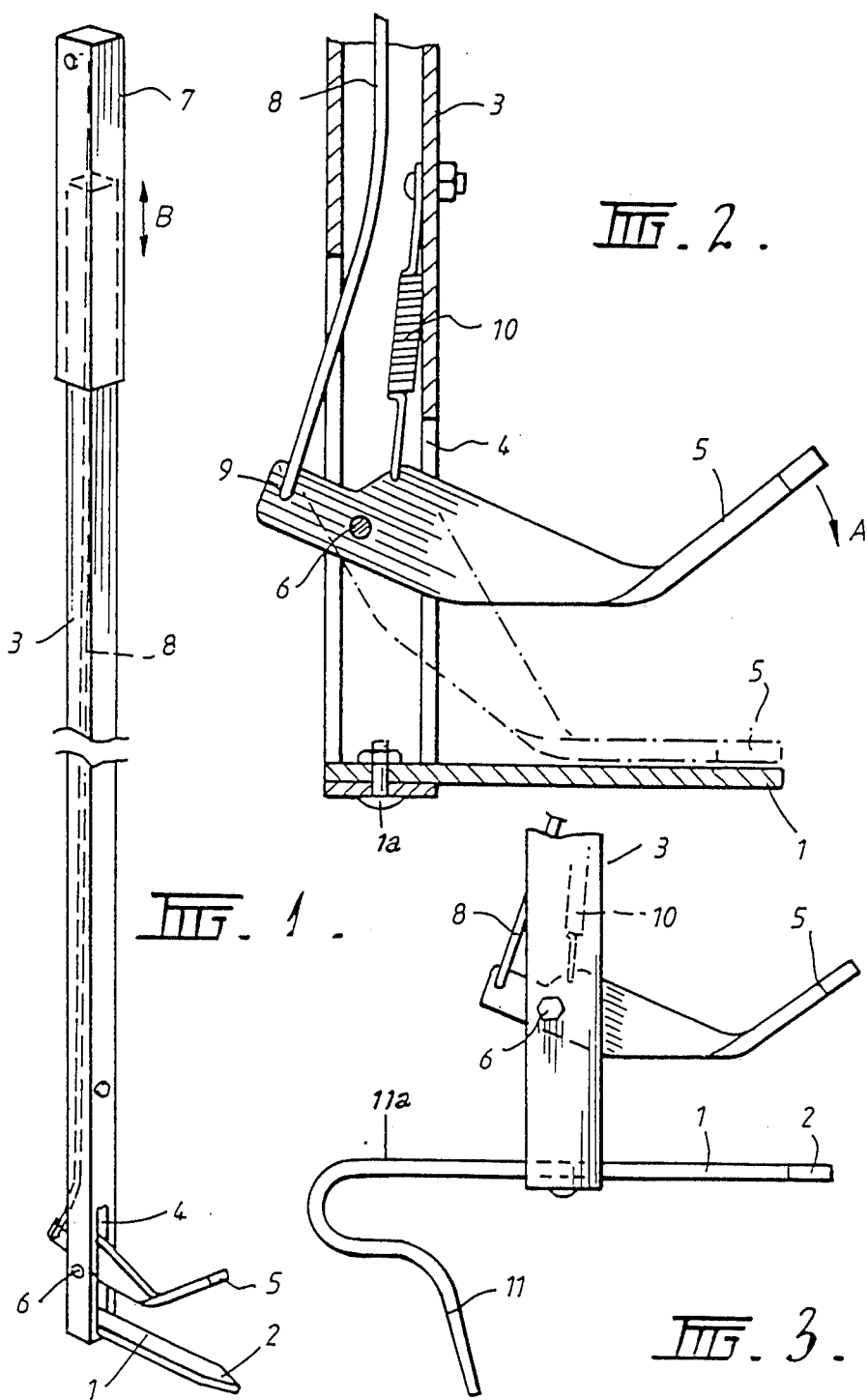

GARDENING IMPLEMENTS

The present invention relates, in general, to improvements in gardening and the like implements and more particularly, but not exclusively, relates to an improved device for use in performing weeding and the like gardening tasks or functions.

For ease of explanation, throughout the ensuing description reference will be made to the use of an implement in accordance with the invention when used in the garden for carrying out tasks such as weeding. It should be realized, however, that an implement in accordance with the invention will lend itself to usage in a variety of other areas and/or contexts, and that the invention is therefore not to be considered restricted to any preferred embodiment or use described.

In the past a number of attempts have been made to arrive at a means or tool allowing for the manual eradication of weeds and the like unwanted growth from gardens, flowerbeds etc. The prior art tools have, however, generally suffered from the disadvantage that the user invariably found it necessary, when using the tool, to adopt a kneeling position, or perhaps more correctly a position other than upright, in order to bring about the desired result. Such a kneeling or other than upright position is, of course, even for the normal, healthy person a somewhat uncomfortable position and lends itself to the onset of all forms of muscular complaint. With less healthy persons, as for example aged and perhaps invalid or in some way incapcitated people, the mere physical act of assuming a kneeling or other than upright position can involve substantial effort and pain. Furthermore, and once in such a position, the prior art tools by their very nature were somewhat unwieldy in their operation and did not lend themselves to easy use by, for example, aged, invalid or in some way physically incapacitated people.

The present invention attempts to overcome the problems and disadvantages associated with the prior art such tools by providing a form of garden weeder or implement which is simple to operate and at the same time does not call for the user to have to adopt or assume a kneeling position, or in fact a position other than standing upright. With the arrangement in accordance with the present invention, therefore, weeding may be effected in a simple manner, with a minimum of physical effort and, more importantly, with there being no need for undue or unnecessary bending, stooping or kneeling.

In accordance with the present invention, therefore, there is provided an implement or apparatus for digging and/or weeding, said apparatus including: an elongate handle member; a first ground-engaging member releasably attached to said handle member; a second ground-engaging member selectively movable into and out of relative engagement with said first member; and means disposed at the remote end of said handle member operable to bring about said selective relative engagement of said first and second ground-engaging members.

In order that the invention may be more clearly understood and put into practical effect reference will now be made to a preferred embodiment of a weeder in accordance with the invention. The ensuing description is given by way of non-limitative example only and is with reference to the accompanying drawings, wherein:

FIG. 1 represents a perspective view of a preferred embodiment of a weeder in accordance with the present invention;

FIG. 2 represents an exploded sectional view of the ground-engaging end and components of the embodiment of FIG. 1, showing the second member in both inoperative (full line) and operative (ghost-line) positions; and FIG. 3 is a view, similar to FIG. 2, of a modified form of tool in accordance with the invention.

As illustrated a weeder in accordance with the present invention includes, as a first component, a first ground-engaging means, in the form of a shaped member, generally designated 1 and provided, at one end thereof, with a tapered section 2. The member 1 may be constructed of any suitable material, be it metal, plastics material or otherwise. In a preferred embodiment, however, a metallic material will be employed in order to allow for greater durability. In use the member 1 is to be employed for purposes of assisting in the levering a weed or other unwanted growth from the earth or the like.

The member 1 is adapted, in use, to be affixed in any known manner to an elongate handle member 3 of any prescribed length. Fixing of the member 1 to the handle member 3 may be achieved by means of bolts, rivets or in fact any means known in the art. In the preferred embodiments illustrated a bolt and nut arrangement 1a is employed for purposes of fixing the member 1 to the handle member 3. In a practical sense, however, the member 1 may be either permanently secured to the handle member 1, as for example by rivetting or welding, or removably secured thereto, as for example by bolts, whereby to alloy perhaps for replacement subsequent to damage, wear, etc.

Again in the preferred embodiment illustrated the handle member 3 has incorporated therein a vertically extending slot 4, the slot 4 being adapted, in use, to have located therethrough and movable therein a second member 5, the second member 5 being adapted, in use, to be pivotally movable relative to the member 1 into and out of engagement therewith. Preferably the second member 5 will be of the shape illustrated, namely a substantial L-shape, whereby to have the "foot" portion 5a thereof disposed parallel to the first member 1 when in the operating position illustrated in phantom in FIG. 2.

To achieve such pivoting movement the member 5 may be pivotally connected to the handle member 3, as for example by pinning at 6. The second member 5 may therefore be seen to be selectively and continuously movable into and out of effective engagement with the first member 1. In the preferred embodiment illustrated a biassing means, in the form of a suitable resilient member, such as for example a spring means 10, is associated with the second member 5 whereby to allow that second member 5, when not in use, to assume a position one of engagement with the first member 1. In an especially preferred embodiment, not illustrated, when not in use the second member 5 will be disposed against and in contact with the handle member 3.

The handle member 3 has associated therewith means 7 operable to allow for the aforementioned selected relative movement of the second member 5 between the positions shown in full and in phantom lines in FIG. 2. In the preferred embodiment illustrated the handle member 3, constructed of any suitable material, is of hollow tubular construction. The actuating means 7 is in the form of a collar member, of a shape substantially complementary to that of the handle member 3, and movable longitudinally of the handle sensor 3 in the direction of the arrow 8 in FIG. 1. The member 7 is operably connected with the member 5 by means of a linkage 8. In the preferred embodiment illustrated the linkage 8 is in the form of a wire, preferably of a metallic material, extending between the member 7 and connected to the member 5 as at 9. In a practical sense the linkage 8 may be either releasably or permanently affixed to the second member 5 in any known manner and using any known means. In a further embodiment, not illustrated, the actuating means may be in the form of a hand-operated "trigger" operably connected with the member 5 by a suitable linkage.

In use the user, by movement of the actuating member 7 via the linkage 8 will bring the second member 5 from the position shown in full lines in FIG. 2 into the position shown in phantom lines in that same FIG. 2. The arrangement is such that any weed, vegetable material or the like retained between the members 1 and 5 in the position shown in phantom in FIG. 2 may therefore be readily shifted, as for example removed from the soil, simply by lifting of the overall tool in a vertical direction as required. The arrangement may therefore be seen to lend itself to an efficient and effective means for clearing weeds and the like unwanted vegetable matter from a browing area. The elongate handle member avoids the need for any bending by the user.

Turning now to the embodiment of FIG. 3, there is illustrated therein a modified version of the tool or implement of FIGS. 1 and 2. The modification resides in the addition thereto of what might be termed a foot member, generally designated at 11. It should be realized that the foot member 11 may either be found integrally with the first member 1 (as illustrated), or be capable of ready affixture thereto by any suitable means, as for example by welding, bolting, rivetting or the like. In the preferred embodiment illustrated the foot member 11 constitutes a rearward extension of the first member 1. In an especially preferred embodiment (not illustrated) the foot member 11 may be forked whereby to facilitate ground engagement. The foot member 11 can serve as a digging member for "levering" unwanted weeds or other vegetable material from a tract of ground, with any such material then being capable for being gripped between the members 1 and 5 for pickup and removal to a suitable waste disposal means or receptacle. More specifically, however, the shape of the foot member 11 assists the actual operation thereof. Indeed the portion 11a, being a rearward extension (in effect) of the first member 1, serves as a means for engagement by the foot of the user whereby to afford easier ground-penetration of the member 11, with the curved portion of that member 11 then providing better leverage.

The apparatus in accordance with the present invention is also usable for a number of other related tasks, as for example the scraping of unwanted material, such as weeds and the like, from crevices, joins and the like existing in concrete pathways, drives etc., again without necessitating any bending on the part of the user. The apparatus could furthermore be employed for purposes of picking up any unwanted material which might be lying loose on a horizontal surface, as for example paper, previously cut foliage, etc. In addition, the tool in accordance with the invention could be readily adapted for performing tasks such as soil aeration, seeding, cultivating in general, and perhaps even for purposes such as hoeing.

In closing it should be realized that the aforegoing description refers merely to preferred embodiment of the invention and that variations and modifications are possible thereto without departing from the spirit and scope of the invention, the ambit of which is to be determined from the following claims.

I claim:

1. An implement for cultivating, digging and/or weeding, said apparatus including: an elongate handle member; a first member fixedly secured to said handle member at the lower end thereof and extending substantially normally thereto, said first member being adapted, in use, to be in ground engagement so as to allow for the cultivation of a garden plot or the like; a second member adapted to be selectively movable between respective inoperative and operative positions into and out relative engagement with said first member, whereby to provide a gripping means for gripping of and removal of unwanted plant or other matter; and actuating means associated with said handle member and operable to bring about said selective relative engagement of said first and second members, said actuating means being in the form of a collar member, of a cross-sectional shape substantially complementary to that of said handle member and disposed around said handle member, said collar member being operably connected to said second member and being movable along said handle member whereby to give rise to said relative movement between said first and second members.

2. The apparatus as claimed in claim 1, wherein said second member is pivotally movable relative to both said first member and said handle member.

3. The apparatus as claimed in claim 2, wherein said collar member is operably connected to said second member, by means of a cable or wire means to be disposed internally of said handle member, whereby selective movement of said collar member longitudinally of said handle member gives rise to said relative movement between said first and second members.

4. The apparatus as claimed in claim 2, wherein said actuating meansis in the form of a hand- or finger-operated trigger means associated with said handle member, said trigger means being operably connected to said second member such that actuation of said trigger means gives rise to said relative movement between said first and second members.

5. The apparatus as claimed in claim 1, including a ground-engaging or foot member associated with said first member, said foot member being shaped whereby to provide a lever action for levering unwanted plant or vegetable material from soil for subsequent collection by said first and second members.

6. The apparatus as claimed in claim 5, wherein said foot member is formed integrally with said first members and as an extension thereof, said foot member including, at the free end thereof, a plurality of tines to assist in ground engagement, cultivation and removal of unwanted plant or other material.

7. The apparatus as claimed in claim 1, constructed substantially of a metallic material.

8. The apparatus as claimed in claim 1, constructed substantially of a plastics material.

* * * * *